United States Patent
Oh et al.

(10) Patent No.: US 8,544,919 B2
(45) Date of Patent: Oct. 1, 2013

(54) MULTI-PURPOSE TONGS

(75) Inventors: Sang Joon Oh, Wonju-si (KR); Myeong Hwan Seol, Gongju-si (KR)

(73) Assignee: Sang Joon Oh, Wonju-si (KR)

( * ) Notice: Subject to any disclaimer, the term of this patent is extended or adjusted under 35 U.S.C. 154(b) by 0 days.

(21) Appl. No.: 13/314,378

(22) Filed: Dec. 8, 2011

(65) Prior Publication Data

US 2012/0146351 A1    Jun. 14, 2012

(30) Foreign Application Priority Data

Dec. 13, 2010 (KR) .................. 10-2010-0126725

(51) Int. Cl.
*B66F 19/00* (2006.01)

(52) U.S. Cl.
USPC ........................................ 294/209; 294/115

(58) Field of Classification Search
USPC ................. 294/209, 16, 99.1, 99.2, 119, 117, 294/106, 19.2, 1.3, 1.4, 115; 172/21, 22, 172/371–375, 378, 379, 381; 7/127, 125, 7/129, 139; 269/3, 6, 24, 32; 254/93 R; 81/90.1, 454; 56/332, 333, 335, 400.1; 30/244–246, 248–251, 254, 296.1; D8/4–7
See application file for complete search history.

(56) References Cited

U.S. PATENT DOCUMENTS

| | | | | |
|---|---|---|---|---|
| 1,220,899 A | * | 3/1917 | Sorensen | 294/115 |
| 3,219,376 A | * | 11/1965 | Peters | 294/115 |
| 4,225,174 A | * | 9/1980 | Hennessy et al. | 294/1.4 |
| 4,547,010 A | * | 10/1985 | Camp | 294/50.9 |
| 4,669,769 A | * | 6/1987 | Polder, Jr. | 294/111 |
| 2004/0194320 A1 | * | 10/2004 | Hsieh | 30/250 |

* cited by examiner

*Primary Examiner* — Stephen Vu
(74) *Attorney, Agent, or Firm* — Novick, Kim & Lee, PLLC; Jae Youn Kim

(57) ABSTRACT

A multi-purpose tongs having a body in which an operation rod is inserted into a hollow hole thereof and a handle fitted to one side of the body while being penetrably formed, at one side thereof, with a slot, includes a vertical flange provided at one side end of the operation rod so as to radially extend, a fixed lever which is penetrably formed, at a central region thereof, with a through hole, the fixed lever being integrally constituted, at one side thereof, with the handle while protruding outward at the other side thereof, and an operation lever which is hinged-fixed, at an intermediate portion thereof, to the fixed lever, the operation lever including an upper operation lever provided, at one side thereof, outward of the handle and a lower operation lever provided, at the other side thereof.

5 Claims, 6 Drawing Sheets

MULTI-PURPOSE TONGS

BACKGROUND OF THE INVENTION

1. Field of the Invention

The present invention relates to a multi-purpose tongs, and more particularly to a multi-purpose tongs for picking up waste paper, footwear and the like in such a manner that when pressing an operation lever mounted at a handle, the operation lever pushes an operation rod within a body so as to close a tongs part which is hinged-connected to the operation rod.

2. Description of the Related Art

In general, most restaurants provide a variety of customer services in which, for example, a service employee, when customers take off their shoes at an entrance, keeps the shoes in a shoe shelf, and then takes the shoes out of the shoe shelf again so as to allow the customers to wear their shoes at the time of departure.

Operations for putting the shoes of the customers into and taking them out of the shoe shelf to arrange the shoes at the entrance as a part of the service, however, are mainly performed by an employee's hand. Accordingly, since these operations generate harmful effects which are infected with various germs such as trichophyton being parasitic on the shoes and are also unsanitary, the restaurants may not be sufficiently maintained under clean conditions.

In order to reduce such harmful effects, a tongs is used at the restaurants so that operations for putting the shoes into and taking them out of the shoe shelf to arrange the shoes may be more sanitarily performed. Consequently, the restaurants may be sufficiently managed and maintained under sanitary conditions.

The tongs is variously utilized to pick up footwear as well as waste paper or for collecting chestnut burrs which naturally fall off a tree.

The tongs of the related art includes a body 111, a handle 160, a pin 121, a spring 130, a support part 140, a tongs part 150, and a fixed lever 163. The body 111 is formed, at the vicinity of an end of one side thereof, with a slot penetrated in a longitudinal direction, and an operation rod 120 is inserted into a hollow hole formed within the body 111. The handle 160 is hinged-coupled, at an intermediate portion thereof, to one end of the operation rod 120 and is inserted into the slot to penetrate the body 111. The pin 121 protrudes radially inward from an inner surface of the other side of the body 111 and is formed to be spaced apart from an outer peripheral side of the operation rod 120. The spring 130 is provided within the body 111 and the operation rod 120 is inserted within the spring 130. The support part 140 is integrally constituted with the other end of the body 111. The support part 140 includes a support piece to allow the operation rod to be penetrated and link pieces 141 and 142 formed to be bent at a right angle at opposite edge ends of the support piece. The tongs part 150 is hinged-coupled with the link pieces 141 and 142 and an intermediate portion of the support part 140, and is bent in a '⊓' shape. The tongs part 150 is comprised of operation parts 153 provided at one side thereof and upper and lower tongs parts 152 and 151 provided at the other side thereof. Each of the lower tongs parts 151 has a saw-toothed shape at opposite side surfaces of an end thereof, thereby picking up chestnut burrs. The fixed lever 163 is fixed, at one end thereof, to an outer peripheral surface of one side of the body 111 while being hinged-fixed, at the other side thereof, to one end of the handle 160.

The related art is operated as follows. When a user pulls the upper operation lever 162 to be adjacent to the body 111 by a thumb and the like in a state of grasping the handle, the operation rod 120 in the body 111 fixed to the handle 160 compresses and the spring 130 and is elastically moved. Accordingly, a pair of operation parts 153, which is hinged-coupled by the pin 121 at a lower portion of the operation rod 120, is pulled upward in a state of being supported by the link pieces 141 and 142.

The opposite operation parts 153, which are hinged-coupled to the opposite link pieces 141 and 142 by the pin 121, are rotated about a hinge coupled with the tongs part 150 and the link pieces 141 and 142 by the pin 121, and thus the operation parts 153 are closed to face each other. Furthermore, the lower tongs parts 151 also approach to face each other, thereby easily picking up chestnut burrs between the lower tongs parts 151.

When the upper operation lever 162 attached to the body 111 is released, the operation rod 120 is moved reward by elastic restoration force of the spring 130. Consequently, the opposite operation parts 153 are opened about the hinge coupled with the tongs part 150 and the link pieces 141 and 142 by the pin 121 in opposite directions, and the opposite lower tongs parts 151 are opened outward so as to be pushed to each other, and thus the lower tongs parts 151 are returned to an original position.

In general, the tongs is used in such a manner that a user directs toward the tongs on the ground in a standing state.

In the tongs of the related art, when the operation lever provide at the handle is pressed in order to pick up items, the operation lever pulls the operation rod in the body and the tongs part which is hinged-connected to the operation rod is closed. Therefore, there is a problem in that the operation lever is pressed beyond force in which weight of the operation rod and gravity force applied to the operation rod are summed during operation of the tongs.

In other words, the force, in which weight of the operation rod and gravity force applied to the operation rod are summed, are required during operation of the tongs.

Also, in the tongs of the related art, although the upper and lower tongs parts are the same in width and the lower tongs part protrudes outward to have a small size, the tongs part is wide than thickness thereof and has lower coupling strength. Therefore, there is a problem in that the tongs is not used in the case of cooking food such as pancakes easily broken to pieces.

In addition, since the tongs of the related art has a structure in which the tongs part is closed by pulling the operation rod, the lower tongs parts protrude outward than the upper tongs parts. Therefore, there is a problem in that the lower tongs parts are not inserted between the ground and items in order to pick up the items which are wide relative to the ground, and thus the wide items may be not grasped.

SUMMARY OF THE INVENTION

Therefore, the present invention has been made in view of the above problems, and it is an object of the present invention to provide a multi-purpose tongs which may be used to cook food such as pancakes without application of weight of an operation rod to a hand of a user, and which may be used as a general tongs to pick up waste paper, footwear and the like.

In accordance with an aspect of the present invention, the above and other objects can be accomplished by the provision of a multi-purpose tongs having a body in which an operation rod is inserted into a hollow hole thereof and a handle fitted to one side of the body while being penetrably formed, at one side thereof, with a slot, the multi-purpose tongs includes a vertical flange provided at one side end of the operation rod so as to radially extend, a fixed lever which is penetrably formed, at a central region thereof, with a through hole, the fixed lever being integrally constituted, at one side thereof, with the handle while protruding outward at the other side thereof, and an operation lever which is hinged-fixed, at an intermediate portion thereof, to the fixed lever, the operation lever being comprised of an upper operation lever provided, at one side thereof, outward of the handle and a lower operation lever provided, at the other side thereof, within the handle so as to come into contact with the vertical flange.

The multi-purpose tongs may further include a pin which protrudes radially inward from an inner surface of one side of the body and which is formed to be spaced apart from an outer peripheral side of the operation rod, and a spring provided between the pin and the vertical flange, the operation rod being inserted within the spring.

The multi-purpose tongs may further include a support part which is provided with a coupling groove for locking an outer periphery of the other side end of the body and an elongated support groove integrally constituted with the coupling groove at an end of the coupling groove while being penetrated in a smaller width than the coupling groove.

The tongs may include a tongs part bent about a hinge hole so as to be provided, at one side thereof, with the operation part while being provided, at the other side thereof, with the upper tongs parts, the operation part being penetrably formed with an elongated tongs hole, and the upper tongs parts being formed to be bent at an intermediate portion of the tongs part.

Each of the upper tongs parts may be further provided with the lower tongs part which has a flat plate shape and is formed, at an outer peripheral surface thereof, with roughened patterns.

The lower operation lever may be further formed, at an outer peripheral surface thereof, with a horizontal protrusion coupled with the vertical flange.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
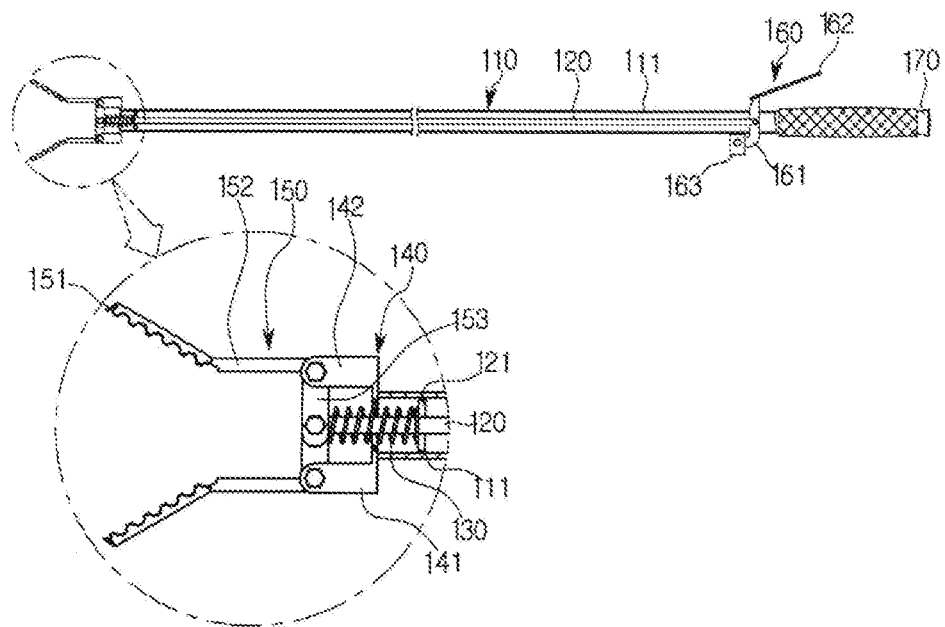
FIG. 1 is a sectional view illustrating a tongs of the related art.
Figure 2:
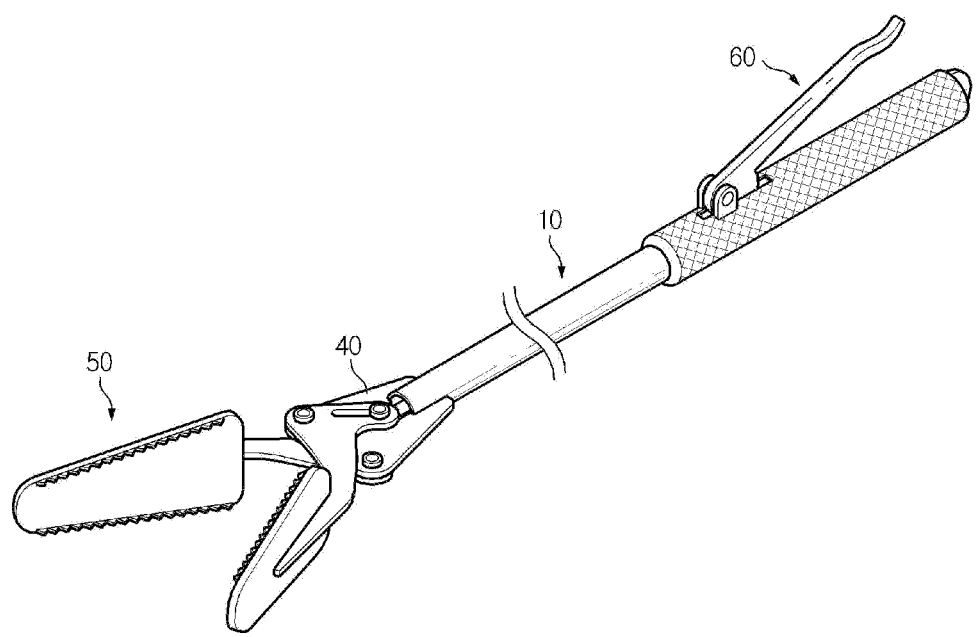
FIG. 2 is a perspective view illustrating a multi-purpose tongs according to an exemplary embodiment of the present invention.
Figure 3:
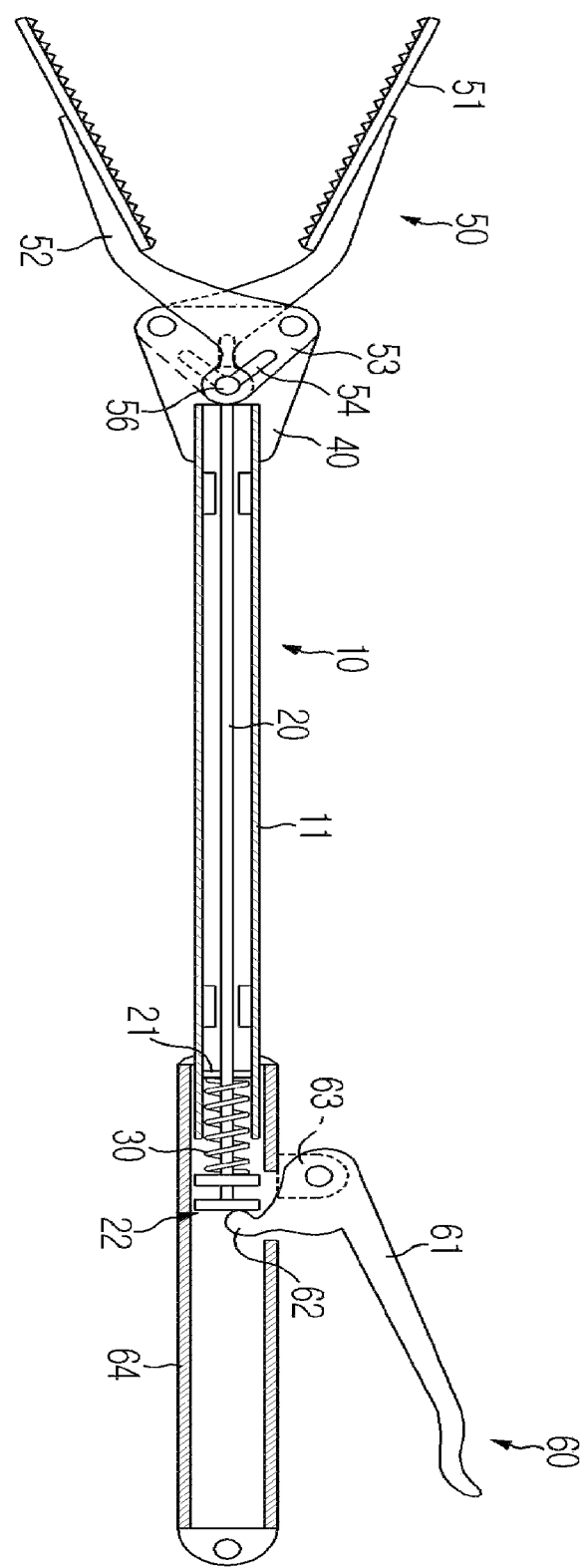
FIG. 3 is a sectional view illustrating the multi-purpose tongs according to the exemplary embodiment of the present invention.
Figure 5:
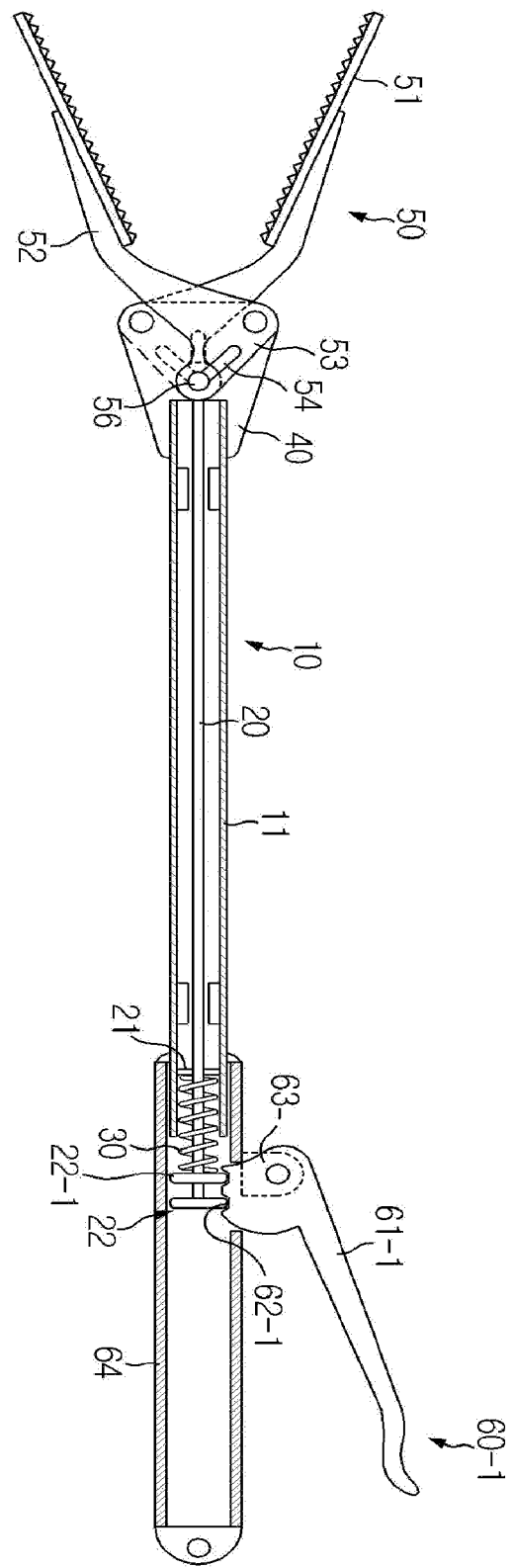
FIG. 5 is a sectional view illustrating a multi-purpose tongs according to another exemplary embodiment of the present invention.
Figure 7:
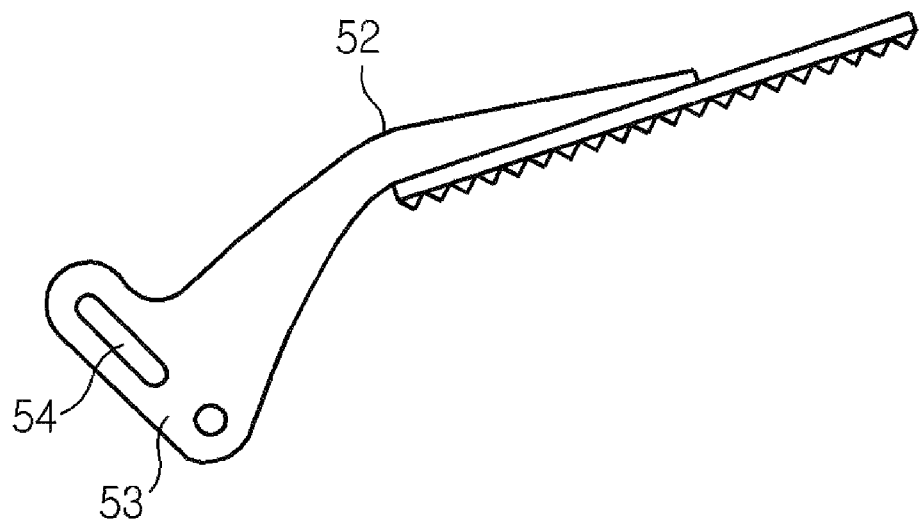
FIG. 7 is a top view illustrating a tongs part according to the present invention.
Figure 8:
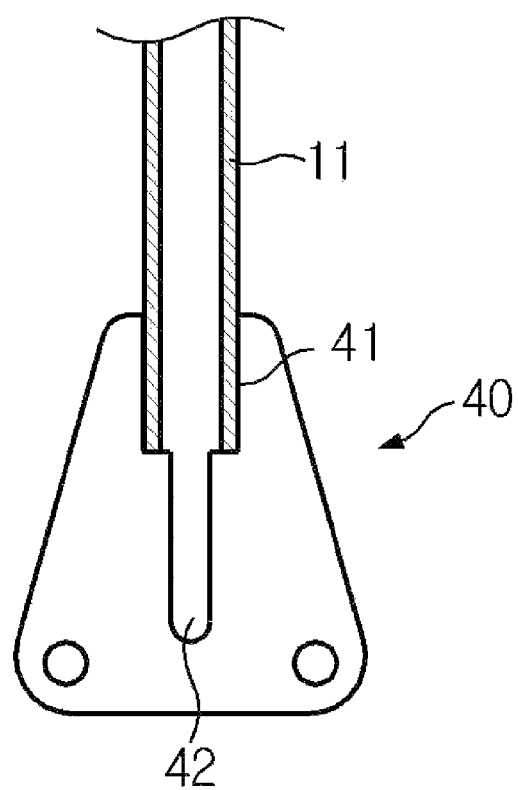
FIG. 8 is a view illustrating a coupling state between a support part and a body according to the present invention.

Hereinafter, exemplary embodiments of the present invention will be described in more detail with reference to FIG. 2 which is a perspective view illustrating a multi-purpose tongs according to an exemplary embodiment of the present invention, FIG. 3 which is a sectional view illustrating the multi-purpose tongs according to the exemplary embodiment of the present invention, FIG. 5 which is a sectional view illustrating a multi-purpose tongs according to another exemplary embodiment of the present invention, FIG. 7 which is a top view illustrating a tongs part according to the present invention, and FIG. 8 which is a view illustrating a coupling state between a support part and a body according to the present invention.

The multi-purpose tongs, which is designated by reference numeral 10, according to exemplary embodiments of the present invention includes, broadly, a handle 64, a body 11, a support part 40, a tongs part 50. The body 11 is provided, at one side, namely, a rear side thereof, with the handle 64 while being provided, at the other side, namely, a front side thereof, with the support part 40. The support part 40 is coupled with the tongs part 50 and an operation rod 20 provided within the body 11 by a hinge 56.

The body 11 has a shape of a hollow circular pipe into which the operation rod 20 is inserted. The handle 64 has a cylindrical shape and is provided at one side end of the body 11 so as to be fitted to an outer peripheral side at the side end of the body 11. The handle 64 is formed, at a vicinity of one side thereof, with a slot penetrated in a longitudinal direction.

Although the body 11 may have a circular, square, or polygonal pipe shape in section, the body 11 is preferably made of the circular pipe in consideration of costs and handling.

The slot is lengthily formed at a vicinity of one side end, namely, an upper portion of the handle 64 in a longitudinal direction of the body 11, the only rear side of the body 11 is inserted up to the slot.

The handle 64 is provided, at an outer peripheral surface thereof in the vicinity of the slot, with a fixed lever 63 which is penetrably formed, at a central region thereof, with a through hole. The fixed lever 63 is integrally fixed, at one side thereof, to the handle 64 while protruding outward at the other side thereof.

An operation lever 60 is hinged-fixed to the fixed lever 63. The operation lever 60 is formed, at an intermediate portion thereof, with a hinge through hole. The operation lever 60 is comprised of an upper operation lever 61 provided, at one side thereof, outward of the handle, and a lower operation lever 62 provided, at the other side thereof, within the handle 64 in such a way as to be integrally constituted with the upper operation lever 61 and to be inserted into the slot of the handle 64.

In other words, the operation lever 60 is divided into the upper and lower operation levers 61 and 62 about a hinge in such a manner that the upper operation lever 61 exists at the outside of the handle 64 and the lower operation lever 62 partially exists within the handle 64.

The hinge through hole of the operation lever 60 and the through hole of the fixed lever 63 are hinged-coupled to each other by a pin so that the operation lever 60 is hinged-rotated with respect to the fixed lever 63.

That is, when a user presses the upper operation lever 61 toward the handle 64 by a hand, the upper operation lever 61 is rotated downward about the hinge and the lower operation lever is hinged-rotated about the hinge in the same direction as the upper operation lever 61 at the same time.

The operation rod 20, made of a rigid material, is formed within the body 11 so as to protrude, at opposite ends thereof, outward of the body 11. In one exemplary embodiment of the present invention, the operation rod 20 is provided, at one side end thereof, with a vertical flange 22 formed in a flange shape so as to radially extend.

Although the operation rod 20 may have a circular, square, or polygonal pipe shape in section, the operation rod 20 is preferably made of the circular pipe in consideration of costs and handling.

The lower operation lever 62 of the operation lever 60 comes into contact with a side surface of the vertical flange 22. Consequently, the lower operation lever 62, which is hinged-rotated about the fixed lever 63, pushes the vertical flange 22 by operation of the upper operation lever 61, thereby operating the operation rod 20 integrally constituted with the vertical flange 22.

That is, when the fixed lever 63 is hinged-coupled with the intermediate portion of the operation lever 60 and the upper operation lever 61 is operated, the lower operation lever 62 is rotated toward the tongs part 50 and the operation rod 20 is advanced, thereby operating the tongs part 50 coupled to the other side of the operation rod 20.

Meanwhile, the body 11 is provided, at an inner surface of one side thereof, with a pin 21. The pin 21 protrudes radially inward from the inner surface of one side of the body 11 and is formed to be spaced apart from an outer peripheral side of the operation rod 20. The pin 21 is also spaced apart from the vertical flange 22.

An outer diameter of the vertical flange 22 is greater than an outer diameter of the operation rod 20, but may be less or greater than an inner diameter of the body 11. When the vertical flange 22 is operated to be inserted into the body 11 during operation of the vertical flange 22, the outer diameter of the vertical flange 22 is formed to be less than the inner diameter of the body 11. On the other hand, when the vertical flange 22 is operated to not be inserted into the body 11 during operation of the vertical flange 22, the outer diameter of the vertical flange 22 is formed to be greater than the inner diameter of the body 11. However, although the outer diameter of the vertical flange 22 is less than the inner diameter of the body 11, the vertical flange 22 may also be operated to not be inserted into the body 11.

A spring 30 is provided between the pin 21 and the vertical flange 22, and the operation rod 20 is inserted within the spring 30. The spring 30 is a cylindrical coil spring partially arranged within the body 11.

The spring 30 elastically supports the vertical flange 22, thereby elastically supporting the operation rod 20 integrally constituted with the vertical flange 22. As a result, the tongs part 50 hinged-coupled to the operation rod 20 is elastically supported.

The spring 30 is provided between the vertical flange 22 fixed to the operation rod 20 and the pin 21 arranged within the body 11 in a state of being inserted into the body 11 so as to allow the vertical flange 22 to be pushed forward. The operation rod 20 moves rearward by elastic restoration force of the spring 30 in a state in which the operation lever 60 is not operated, thereby allowing the tongs to be opened.

In other words, when the operation lever 60 is operated, the spring 30 is compressed between the pin 21 and the vertical flange 22. On the other hand, when the operation lever 60 is returned to an original position, the operation rod 20 is moved to an original position, and thus the tongs is returned to an original state.

Accordingly, the tongs part 50 is rotatably operated by the hinge 56 depending on operation of the operation lever 60.

The support part 40 is provided at the other side end of the body 11. The support part 40 is formed with a coupling groove 41 for integrally locking an outer periphery of the other side end, namely, the front side of the body 11, and an elongated support groove 42 integrally constituted with the coupling groove 41 at an end of the coupling groove 41 while being penetrated in a smaller width than the coupling groove 41.

The support part 40 has a plate shape and is formed in a substantially triangular shape so as to allow the other side of the support part 40 to be greater than one side thereof coupled to the body 11. The coupling groove 41 and the elongated support groove 42 are integrally constituted at a central portion of the support part 40 in an inward direction from one side surface of the support part 40, and thus the tongs part 50 is hinged-fixed to the support part 40.

In a state in which the outer periphery of the other side end of the body 11, the support part 40, an inner surface of the coupling groove 41 is fixed by welding and the like, the other end of the operation rod 20 in the body 11 protrudes outward of the other end of the body 11, and the other end of the operation rod 20 protruding from the other end of the body 11 is located at the elongated support groove 42 of the support part 40.

Meanwhile, the support part 40 is formed at opposite edges of the other side thereof with through holes to allow the tongs part 50 to be hinged-coupled. Accordingly, the support part 40 is hinged-coupled, at a lower end thereof, with the tongs part 50.

That is, the operation rod 20 is moved forward of the body 11 and is located at the elongated support groove 42. Consequently, the operation rod 20 is coupled, at the other side end thereof, with the tongs part 50 by the hinge 56 in a pin-jointed manner.

The support part 40 is hinged-coupled, at a lower portion thereof, with the tongs part 50 by the pin so that the tongs part 50 may be rotated by the hinge while being stably supported.

The tongs part 50 is hinged-coupled with the support part at an intermediate portion of the support part 40. The tongs part 50 is hinged-coupled, at one side thereof, to the other end of the operation rod 20, and includes an operation part 53 and a pair of upper tongs parts 52.

In other words, the tongs part 50 is bent about a hinge hole so as to be provided, at one side thereof, with the operation part 53 while being provided, at the other side thereof, with the upper tongs parts 52. The operation part 53 is penetrably formed with an elongated tongs hole 54, and the upper tongs parts 52 are formed to be bent at an intermediate portion of the tongs part 50.

The tongs part 50 is bent in a '⌐' shape about the hinge coupled with the support part 40 at the intermediate portion of the tongs part 50 in the pin-jointed manner. The tongs part 50 is comprised of the operation part 53 provided at one side thereof and the upper tongs parts 52 provided at the other side thereof. The operation part 53 and the upper tongs parts 52 are integrally constituted.

The elongated tongs hole 54 is lengthily penetrated in a longitudinal direction of the operation part 53 so that the other side end of the operation rod 20, the elongated tongs hole 54, and the elongated support groove 42 are simultaneously coupled by the hinge 56. As a result, the hinge 56 slides along the elongated tongs hole 54 and elongated support groove 42 by operation of the operation rod 20, and thus the tongs part 50 is operated.

That is, the tongs part 50 is hinged-coupled, at the intermediate portion thereof, to the other end of the operation rod 20. The tongs part 50 is provided, at the other side thereof, of the upper tongs parts 52 for serving as the tongs. The upper tongs parts 52 are bent and extend at the operation part 53, and are integrally constituted.

Meanwhile, the upper tongs parts 52 are integrally constituted and extend, and are respectively provided with lower tongs parts 51. Each of the lower tongs parts 51, which have a flat plate shape, is formed, at an outer peripheral surface thereof, with roughened patterns. Each upper tongs part is formed, at an intermediate portion thereof, with a protrusion, whereas each lower tongs part 51 is formed, at an intermediate portion thereof, with an elongated protrusion coupling groove so that the protrusion is inserted into the protrusion coupling groove. Consequently, the upper tongs part 52 is coupled with the lower tongs part 51.

In this case, a height of the protrusion is equal to or less than a thickness of the lower tongs part 51, and thus the protrusion is not exposed to a plane surface of the lower tongs part 51.

In another exemplary embodiment of the present invention, a lower operation lever 62 may further be provided with a horizontal protrusion 62-1, and a vertical flange 22 or 22-1 similar to the previous embodiment may be provided. The horizontal protrusion 62-1 is coupled with the vertical flange 22 or 22-1 and is formed at an outer peripheral surface of the lower operation lever 62.

During operation of an upper operation lever 61-1, the horizontal protrusion 62-1 pushes the vertical flange 22 or 22-1, and thus the tongs part 50 is operated.

In detail, when the upper operation lever 61-1 is operated toward the handle 64 by a hand of a user, the horizontal protrusion 62-1 is hinged-rotated about the fixed lever 63 in the same direction as the upper operation lever 61-1, namely, toward the support part 40.

In this case, the horizontal protrusion 62-1 pushes the vertical flange 22 or 22-1 engaged with the horizontal protrusion 62-1 so that the operation rod 20 integrally coupled with the vertical flange 22 or 22-1 is advanced, thereby operating the tongs part 50 hinged-coupled to the operation rod 20.

The upper and lower tongs parts 52 and 51 may be integrally constituted by welding of a contact portion between the upper and lower tongs parts 52 and 51. Also, the roughened patterns, which are formed at the outer peripheral surface of each lower tongs part 51, face each other by bending edges of the lower tongs part 51.

The tongs part 50 has a strip shape and the lower tongs part 51 has a flat plate shape while being formed with the tongs part 50 at a right angle, and thus the lower tongs part 51 may have a wide area than the tongs part 50. Also, the lower tongs part 51 may be constituted so as not to protrude outward from the support part 40, thereby easily grasping or turning food such as pancakes which are wide relative to the ground and have weak strength.

The tongs part 50 is slightly bent with respect to the intermediate portion thereof and is comprised of the upper tongs parts 52 and the operation part 53. Each upper tongs part 52 is provided with the lower tongs part 51 of which opposite side surfaces respectively have roughened patterns. When the tongs part 50 is operated, a pair of lower tongs parts 51 having the roughened patterns faces each other. In accordance with such a configuration, the opposite lower tongs parts 51 approach toward each other so as to pick up waste paper, footwear and the like positioned between the opposite lower tongs parts 51.

Each lower tongs part 51 is coated, at an outer surface thereof, with a cushion member made of a urethane, rubber material, or the like so as to grasp a smooth fruit, thereby preventing a surface of the fruit from being damaged.

Meanwhile, since the body 11 is made of a pipe shape, the body 11 may be provided, at a front end thereof, with a cover for prevention foreign matter from being invaded into the body 11 from the end of the body 11 and for prevention a user from suffering abrasions due to the end of the body 11.

Figure 4:
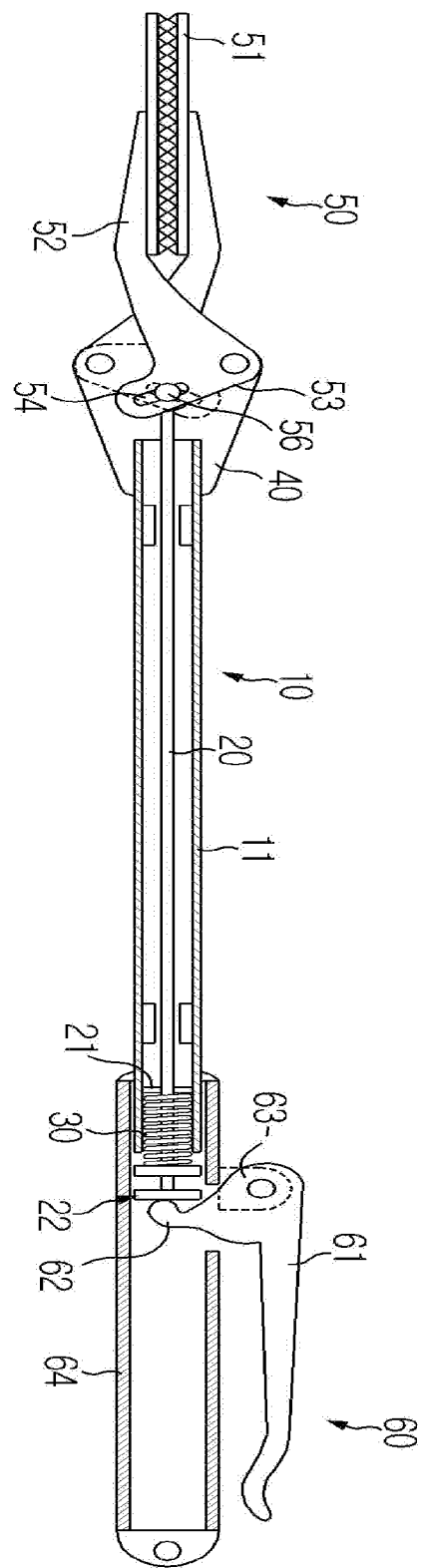
FIG. 4 is an operational view of the multi-purpose tongs according to the exemplary embodiment of the present invention.
Figure 6:
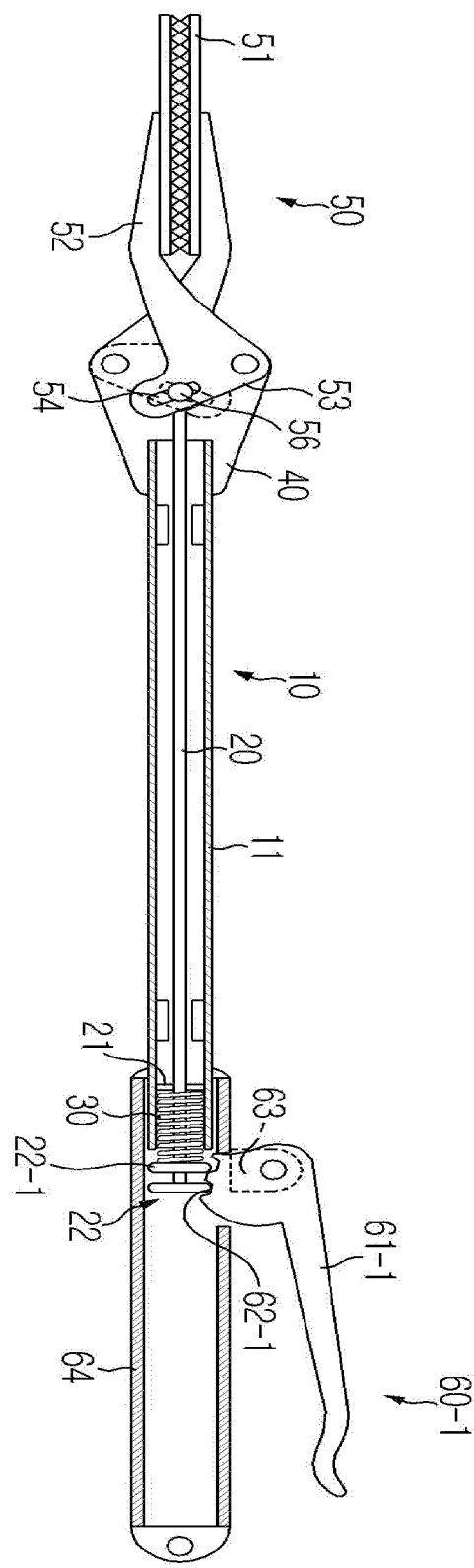
FIG. 6 is an operational view of the multi-purpose tongs according to another embodiment of the present invention.

Operations according exemplary embodiments of the present invention will be described below with reference to FIG. 3 which is a sectional view illustrating the multi-purpose tongs according to the exemplary embodiment of the present invention, FIG. 4 which is an operational view of the multi-purpose tongs according to the exemplary embodiment of the present invention, FIG. 5 which is a sectional view illustrating a multi-purpose tongs according to another exemplary embodiment of the present invention, and FIG. 6 which is an operational view of the multi-purpose tongs according to another embodiment of the present invention.

In one exemplary embodiment of the present invention, when a user presses the upper operation lever 61 toward the handle 64 by the hand in a state of grasping the handle 64, the lower operation lever 62, which is hinged-locked to the fixed lever 63 and is integrally constituted with the upper operation lever 61, is hinged-rotated toward the support part 40.

During rotation of the lower operation lever 62 by the hinge, the lower operation lever 62 pushes the vertical flange 22, and thus the spring 30 between the vertical flange 22 and the pin 21 is compressed.

In this case, the operation rod 20, which is integrally constituted with the vertical flange 22, is advanced toward the support part 40. Furthermore, the hinge, which is provided at the other side end of the operation rod 20 and is hinged-coupled with the support part 40, slides along the elongated support groove 42 and the elongated tongs hole 54 at the same time.

Due to sliding of the hinge along the elongated tongs hole 54, the operation part 53 is rotated about the hinge by which the tongs part 50 and the support part 40 are hinged-coupled.

The operation part 53, which is hinged-coupled to the support part 40 in the pin-jointed manner, is rotated about the hinge so that the upper tongs parts 52 are closed to face each other. Accordingly, the lower tongs parts 51, which are provided at the respective upper tongs parts 52, approach to face each other, thereby easily picking up items between the lower tongs parts 52.

When the upper operation lever 61 attached to the body 11 is released, the operation rod 20 is moved reward by elastic restoration force of the spring 30. Consequently, the upper tongs parts 52 are opened in opposite directions and the opposite lower tongs parts 51 are opened outward, and thus the lower tongs parts 51 are returned to an original position.

In another exemplary embodiment of the present invention, during rotation of the lower operation lever 62 by the hinge, the horizontal protrusion 62-1 of the lower operation lever 62 pushes the vertical flange 22 or 22-1 engaged with the horizontal protrusion 62-1 and the spring 30 between the vertical flange 22 or 22-1 and the pin 21 is compressed. Since operation hereafter is the same as the previous embodiment, no description will be given.

As is apparent from the above description, since the operation lever, when operation lever mounted at the handle is pressed, pushes the operation rod within the body and the tongs part is closed, weight of the operation rod is not applied to a hand. As a result, force required for action of the tongs may be reduced.

Also, the lower tongs part may be constituted so as not to protrude outward from the support part, thereby easily grasping items which are wide relative to the ground.

In addition, the hinge, which simultaneously couples the elongated support groove, the operation rod, and the elongated tongs hole of the tongs part, slides along the elongated tongs hole and elongated support groove, and thus operation force at the tongs part may be distributed.

Furthermore, the lower tongs part is attached to the upper tongs part. As a result, a size of the lower tongs part may be determined depending on a use of the tongs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pair of multi-purpose tongs having a body in which an operation rod is inserted into a hollow hole thereof and a handle fitted to one side of the body while being penetrably formed, at one side thereof, with a slot, the pair of multi-purpose tongs comprising:
    a vertical flange provided at one side end of the operation rod so as to radially extend;
    a fixed lever which is penetrably formed, at a central region thereof, with a through hole, the fixed lever being integrally constituted, at one side thereof, with the handle while protruding outward at another side thereof;
    an operation lever which is hinged-fixed, at an intermediate portion thereof, to the fixed lever, the operation lever including an upper operation lever provided, at one side thereof, outward of the handle and a lower operation lever provided, at another side thereof, within the handle so as to come into contact with the vertical flange; and
    a support part which is provided with a coupling groove for locking an outer periphery of another side end of the body and an elongated support groove integrally constituted with the coupling groove at an end of the coupling groove while being penetrated in a smaller width than the coupling groove,
    wherein the lower operation lever pushes the vertical flange by operation of the upper operation lever, thereby operating the pair of multi-purpose tongs, and
    wherein the pair of multi-purpose tongs is formed so as to be hinged-fixed to the support part.

2. The pair of multi-purpose tongs according to claim 1, further comprising:
    a tongs part bent about a hinge hole so as to be provided, at one side thereof, with an operation part while being provided, at another side thereof, with upper tongs parts, the operation part being penetrably formed with an elongated tongs hole, and the upper tongs parts being formed to be bent at an intermediate portion of the tongs part,
    wherein another side end of the operation rod, the elongated tongs hole, and the elongated support groove are simultaneously coupled by a hinge, and thus the pair of multi-purpose tongs is operated in such a manner that the hinge slides along the elongated tongs hole and elongated support groove by operation of the operation rod.

3. The pair of multi-purpose tongs according to claim 2, wherein each of the upper tongs parts is further provided with a lower tongs part which has a flat plate shape and is formed, at an outer peripheral surface thereof, with roughened patterns.

4. The pair of multi-purpose tongs according to claim 1, wherein:
    the lower operation lever is further formed, at an outer peripheral surface thereof, with a horizontal protrusion coupled with the vertical flange; and
    the horizontal protrusion pushes the vertical flange by operation of the upper operation lever, thereby operating the pair of multi-purpose tongs.

5. A pair of multi-purpose tongs having a body in which an operation rod is inserted into a hollow hole thereof and a handle fitted to one side of the body while being penetrably formed, at one side thereof, with a slot, the pair of multi-purpose tongs comprising:
    a vertical flange provided at one side end of the operation rod so as to radially extend;
    a fixed lever which is penetrably formed, at a central region thereof, with a through hole, the fixed lever being integrally constituted, at one side thereof, with the handle while protruding outward at another side thereof;
    an operation lever which is hinged-fixed, at an intermediate portion thereof, to the fixed lever, the operation lever including an upper operation lever provided, at one side thereof, outward of the handle and a lower operation lever provided, at another side thereof, within the handle so as to come into contact with the vertical flange;
    a pin which protrudes radially inward from an inner surface of one side of the body and which is formed to be spaced apart from an outer peripheral side of the operation rod; and
    a spring provided between the pin and the vertical flange, the operation rod being inserted within the spring,
    wherein the lower operation lever pushes the vertical flange by operation of the upper operation lever, thereby operating the pair of multi-purpose tongs, and
    wherein the spring allows the operation rod to be returned to an original position, and thus the pair of multi-purpose tongs is returned to original state.

* * * * *